(12) United States Patent  (10) Patent No.: US 6,697,264 B2
Ikeura  (45) Date of Patent: Feb. 24, 2004

(54) PORTABLE ELECTRONIC APPARATUS HAVING ELECTRIC CABLE ACCOMMODATING DEVICE

(75) Inventor: Kiyoshi Ikeura, Niigata (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/011,275

(22) Filed: Dec. 11, 2001

(65) Prior Publication Data

US 2002/0071266 A1 Jun. 13, 2002

(30) Foreign Application Priority Data

Dec. 12, 2000 (JP) .................................... 2000-377639

(51) Int. Cl.[7] ............................ H02B 1/20; H02G 11/02
(52) U.S. Cl. ...................... 361/826; 361/683; 206/702
(58) Field of Search ................................. 361/826, 737, 361/683, 686; 206/702, 701; 174/68.1

(56) References Cited

U.S. PATENT DOCUMENTS 4,911,662 A * 3/1990 Debortoli et al. ........... 439/719
5,353,367 A * 10/1994 Czosnowski et al. ....... 385/135
5,521,369 A * 5/1996 Kumar ................... 235/472.01
5,898,568 A * 4/1999 Cheng ......................... 361/695
6,104,607 A * 8/2000 Behl ........................... 361/687

FOREIGN PATENT DOCUMENTS

| JP | 10-333781 | | 12/1998 |
| JP | 2000-118050 | * | 4/2000 |
| JP | 3097670 | | 8/2000 |

* cited by examiner

*Primary Examiner*—Jayprakash N. Gandhi
(74) *Attorney, Agent, or Firm*—McGinn & Gibb, PLLC

(57) ABSTRACT

A notebook type personal computer is equipped with a modem connector for connecting between a modem built therein and a telephone line and an existing card slot in which a LAN card etc. can be inserted. A plug connected at an end of a modem cable is inserted into the modem connector. The modem cable is accommodated in an electric cable accommodating device in the state that a part of the modem cable is wound up about a reel. Further, the plug connected at the other end of the modem cable is inserted into a connector installed at an indoor wall surface etc. The modem cable connects between the modem built in the notebook type personal computer and the telephone line, that is, the connector. The electric cable accommodating device can be inserted into and extracted from the card slot.

18 Claims, 5 Drawing Sheets

PORTABLE ELECTRONIC APPARATUS HAVING ELECTRIC CABLE ACCOMMODATING DEVICE

BACKGROUND OF THE INVENTION

This invention relates to a portable electronic apparatus having an electric cable accommodating device and, more particularly, to an electric cable accommodating device used for a notebook type personal computer which accommodates an electric cable or a plurality of electric cables.

Conventionally, a portable electronic apparatus such as a notebook type personal computer or the like is often carried with a modem cable which connects a modem used for communication to a telephone line. Actually, the modem cable is carried separately from the portable electronic apparatus in the state of the modem cable only or accommodated in the accommodating device. Therefore, the portability of the portable electronic apparatus is degraded.

Further, the modem can not be connected with the telephone line in case where the user has forgotten to carry the modem cable or the modem cable has been lost.

Accordingly, a portable electronic apparatus having a modem cable and the accommodating device for accommodating the modem cable therein is described in Japanese Unexamined Patent Publication (JP-A) No. 333781/1998. According to the publication, an end of the modem cable is connected with a modem circuit while the other end of the modem cable is connected with a plug. A pulley rotates in order to transport the modem cable smoothly. The modem cable accommodating device will later be described in detail.

Because the conventional portable electronic apparatus has a space which accommodates the modem cable accommodating device, the size of the portable electronic apparatus becomes larger. As a result, the portability of the portable electronic apparatus is degraded. Further, the notebook type personal computer and so forth can be connected with a network such as the Internet, for instance, by using a PHS (personal handyphone system). Accordingly, when the modem need not be connected with the telephone line, the modem cable accommodating device for the modem cable is not required. Consequently, the portable electronic apparatus having the space which accommodates the modem cable accommodating device is now required for its improvement when the actual circumstances are considered.

SUMMARY OF THE INVENTION

It is therefore an object of this invention to provide a portable electronic apparatus having an electric cable accommodating device.

It is another object of this invention to provide a portable electronic apparatus having a compact structure.

In accordance with an aspect of this invention, there is provided a portable electronic apparatus having an electric cable accommodating device, the portable electronic apparatus having an existing card slot, wherein the electric cable accommodating device is inserted into and extracted from the existing card slot.

DESCRIPTION OF THE PREFERRED EMBODIMENTS

Figure 1:
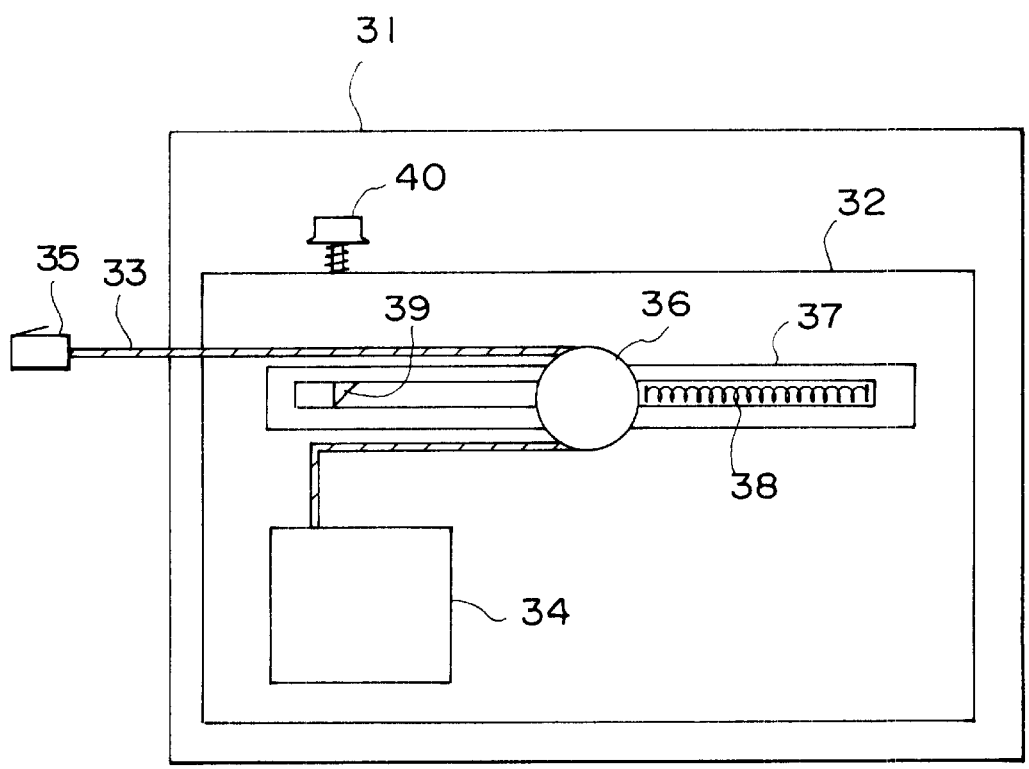
FIG. 1 is a sectional view of a conventional notebook type personal computer having a modem cable accommodating device.

Referring to FIG. 1, a conventional notebook type personal computer having a modem cable accommodating device will first be described in order to facilitate an understanding of this invention.

The conventional notebook type personal computer 31 contains the modem cable accommodating device 32. An end of a modem cable 33 is connected with a modem circuit 34 while the other end of the modem cable 33 is connected with a plug 35. The modem cable 33 is transported through a pulley 36. The pulley 36 is guided along a rail 37 and is always pulled to the right direction by a coil spring 38. Therefore, the plug 35 is smoothly drawn out from the modem cable accommodating device 32. A stopper 39 maintains the modem cable 33 at the perfectly drawn out position. The stopper 39 is released by a switch 40.

Figure 2:
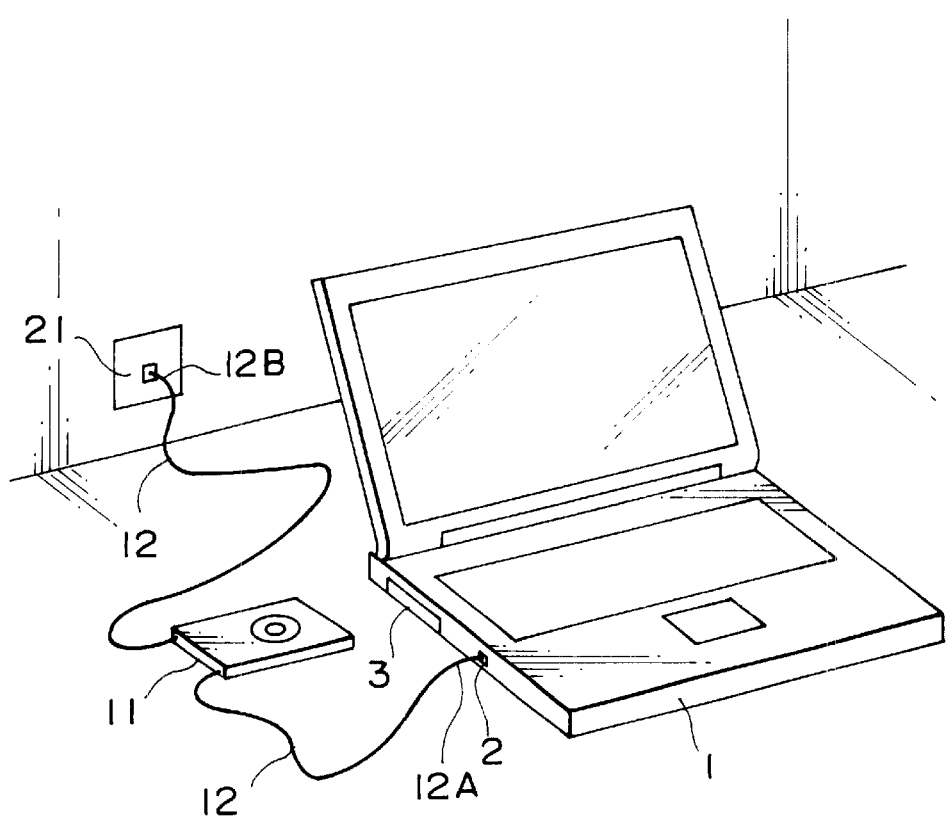
FIG. 2 is a perspective view of a notebook type personal computer having an electric cable accommodating device according to a first embodiment of this invention when an electric cable is drawn out from the electric cable accommodating device.
Figure 3:
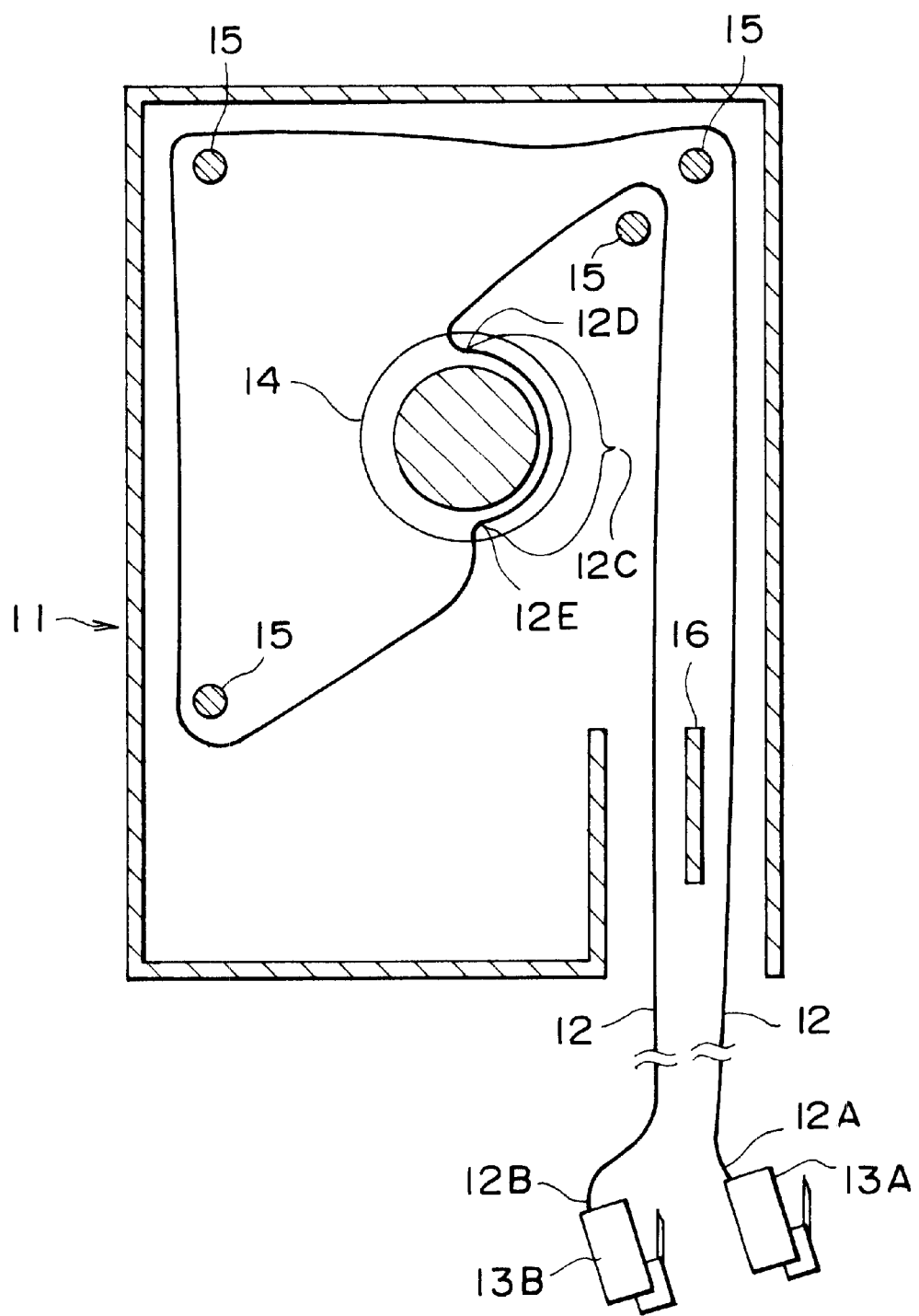
FIG. 3 is a horizontal sectional view of the electric cable accommodating device of the notebook type personal computer according to the first embodiment of this invention when the electric cable is drawn out from the electric cable accommodating device.

Referring now to FIGS. 2 and 3, the description will proceed to a notebook type personal computer having an electric cable accommodating device according to a first preferred embodiment of this invention.

As shown in FIGS. 2 and 3, a notebook type personal computer 1 is equipped with a modem connector 2 for connecting between a modem (not shown) built therein and a telephone line, i.e., a connector 21 and an existing card slot 3 in which a LAN card etc. can be inserted. A plug 13A connected at an end 12A of a modem cable 12 is inserted into the modem connector 2. A plug 13B connected at the other end 12B of the modem cable 12 is inserted into the connector 21 installed at an indoor wall surface etc. The model cable 12 connects between the modem built in the notebook type personal computer 1 and the telephone line.

As shown FIG. 3, the modem cable 12 is accommodated in an electric cable accommodating device 11 at the state that a part of the modem cable 12 is wound up about a reel 14.

Here, the electric cable accommodating device 11 has structure and form which can be inserted into and extracted from the existing card slot 3. The electric cable accommodating device 11 has the same size as the LAN card etc. have. For the sake of explanation, FIG. 2 shows the appearance that the modem built in the notebook type personal computer 1 is connected with the telephone line when the cable accommodating device 11 has been extracted from the existing card slot 3. In the state that the electric cable accommodating device 11 has been inserted into the existing card slot 3, the modem built in the notebook type personal computer 1 can also be connected with the telephone line.

FIG. 3 is a horizontal sectional view of the electric cable accommodating device 11 shown in FIG. 2. The electric cable accommodating device 11 contains the reel 14, four auxiliary guiding members 15, a separating plate 16, and the modem cable 12. The middle portion 12C of the modem cable 12 is fixed at the reel 14. An end 12D and the other end 12E of the middle portion 12C are arranged on the identical plane. Otherwise the end 12D of the middle portion 12C may be away from the other end 12E of the same in the axial direction (that is, the perpendicular direction to the drawing paper) of the reel 14. The auxiliary guiding members 15 and the separating plate 16 prevent the right and left sides of the modem cable 12 from being entangled with each other. The separating plate 16 reinforces the electric cable accommodating device 11.

FIG. 2 shows the state that the modem cable 12 has already been drawn out from the electric cable accommodating device 11. When the reel 14 is rotated in a direction by manual operation or an electric motor, the right and left sides of the modem cable 12 is wounded up about the reel 14 without twining each other by means of the auxiliary guiding members 15 and the separating plate 16.

When the modem cable 12 is drawn out by the manual operation, the reel 14 rotates in the opposite direction to the above-mentioned direction.

Figure 4:
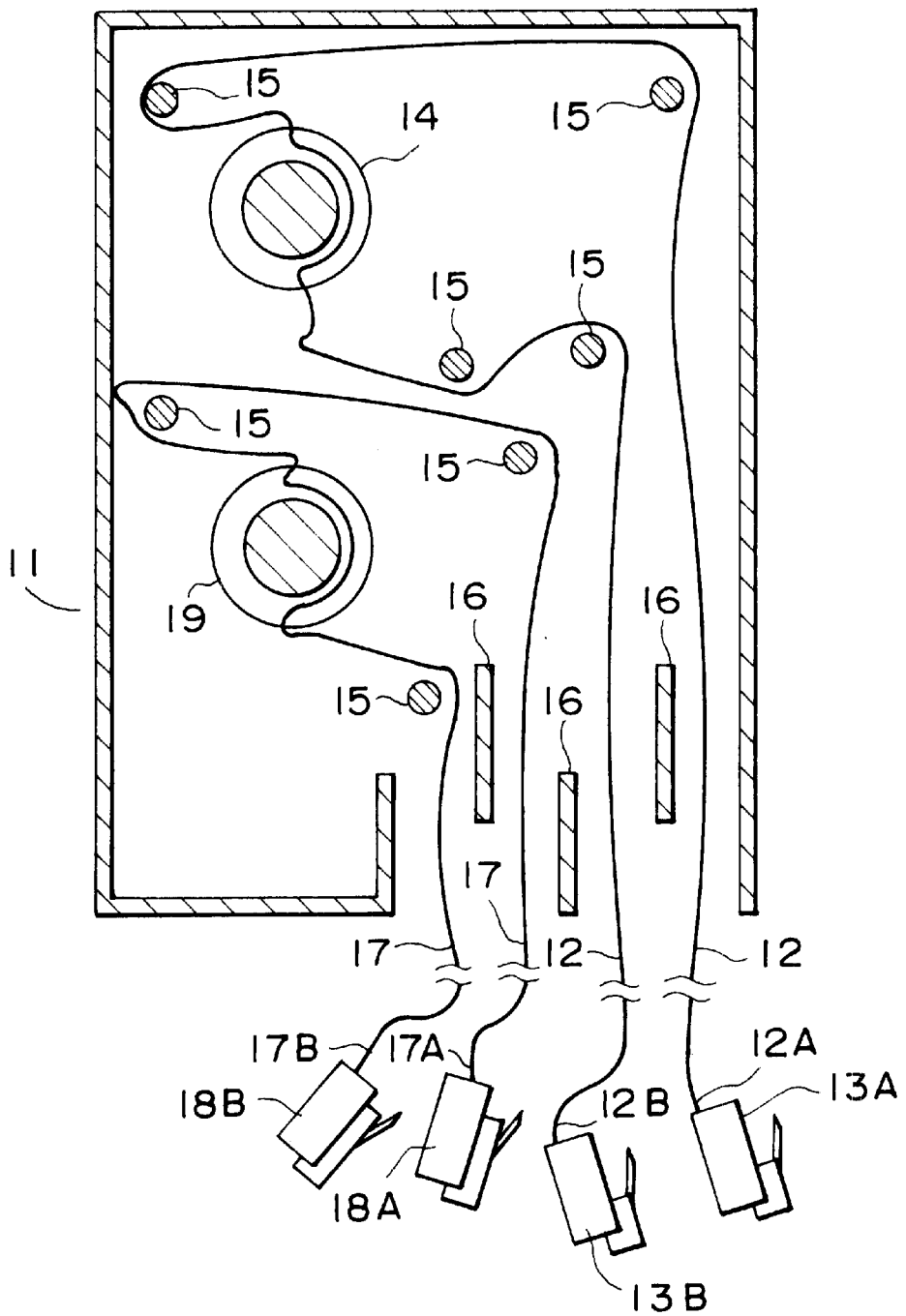
FIG. 4 is a horizontal sectional view of an electric cable accommodating device of a notebook type personal computer according to a second embodiment of this invention when two electric cables are drawn out from the electric cable accommodating device.

FIG. 4 is a horizontal sectional view of an electric cable accommodating device 11 of a notebook type personal computer 1 according to a second embodiment of this invention. The electric cable accommodating device 11 contains two reels 14 and 19, seven auxiliary guiding members 15, three separating plates 16, a modem cable 12, and a USB (Universal Serial Bus) cable 17. A plug 18A is connected at an end 17A of the USB cable 17. A plug 18B is connected at the other end 17B of the USB cable 17.

FIG. 4 shows the state that the modem cable 12 and the USB cable 17 have already been drawn out from the electric cable accommodating device 11. When the reels 14 and 19 rotate in a direction, the modem cable 12 and the USB cable 17 are wounded up about the reels 14 and 19 without twining one another by means of the auxiliary guiding members 15 and the separating plates 16, respectively.

When the modem cable 12 and the USB cable 17 are drawn out, the reels 14 and 19 rotate in the opposite direction to the above-mentioned direction, respectively.

Figure 5:
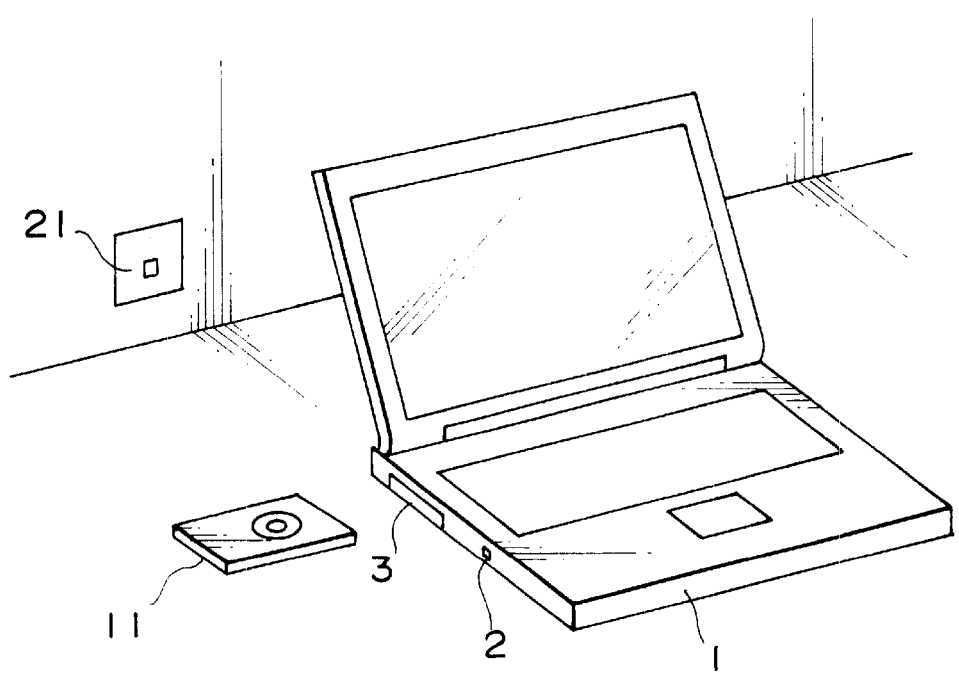
FIG. 5 is a perspective view of the notebook type personal computer having the electric cable accommodating device according to the second embodiment of this invention when the two electric cables are accommodated into the electric cable accommodating device.

FIG. 5 shows the state that the modem cable 12 and the USB cable 17 are accommodated in the electric cable accommodating device 11. The electric cable accommodating device 11 has structure and form which can be inserted into and extracted from the existing card slot 3. Accordingly, the notebook type personal computer 1 can be carried in the state that the electric cable accommodating device 11 has been inserted into the existing card slot 3 thereof.

The electric cable accommodating device 11 is not limited to one shown in FIG. 3 or 4. Further, the cables 12 and 17 are not necessarily wound up about the reels 14 and 19, respectively. When the electric cable accommodating device 11 has been inserted into the existing card slot 3 of the notebook type personal computer 1, a part of the electric cable accommodating device 11 acts as a cover of the existing card slot 3. Consequently, the electric cable accommodating device 11 can prevent dust from entering into the existing card slot 3.

Further, the electric cable accommodating device 11 can be extracted from the existing card slot 3 by operation of an ejecting switch previously installed at the notebook type personal computer 1.

In the second embodiment, the modem cable 12 and the USB cable 17 are accommodated in the electric cable accommodating device 11 as mentioned above. Other connecting cables for peripheral equipments of the notebook type personal computer 1 can be accommodated in the electric cable accommodating device 11. And besides, a tilt up stand with installable and removable structure described in Japanese Patent Publication (JP-B2) No. 3097670 may be accommodated in the existing card slot 3.

Furthermore, in the second embodiment, the electric cable accommodating device 11 is inserted into and extracted from the existing card slot 3 as mentioned above. Usually, a notebook type personal computer 1 is equipped with not only the card slot 3, but also a peripheral bay (not shown). By using the bay, a recording and reproducing device for optical recording media such as a CD-R (CD Recordable) or a recording and reproducing device for magnetic recording media such as a FD (Flexible Disk) is connected to the notebook type personal computer 1. The electric cable accommodating device 11 can be inserted into and extracted from the existing peripheral bay. In such case, the electric cable accommodating device 11 has structure and form which can be inserted into and extracted from the existing peripheral bay, of course.

As will be apparent from the above-mentioned description, this invention can obtain the following effects.

1. It is provided a portable electronic apparatus having the electric cable accommodating device which is inserted into and extracted from the existing card slot thereof.

2. It is provided the portable electronic apparatus having a compact structure.

What is claimed is:

1. A portable electronic apparatus, comprising:
   an electric cable accommodating device which accommodates at least one electric cable having two connectable ends;
   a connector for connecting said at least one electric cable; and
   an existing card slot,
     wherein said electric cable accommodating device is removably inserted into said existing card slot, and
   wherein at least one of said two connectable ends is removably inserted into said connector.

2. A portable electronic apparatus, comprising:
   an electric cable accommodating device comprising a rotatable reel for accommodating at least one electric cable; and
   an existing card slot,
     wherein said electric cable accommodating device is removably inserted into said existing card slot.

3. The portable electronic apparatus according to claim 2, wherein said electric cable comprises connectable ends which, are drawn out of said electric cable accommodating device.

4. The portable electronic apparatus according to claim 2, wherein
   said electric cable comprises connectable ends which, are drawn out from said electric cable accommodating device when said electric cable accommodating device has been inserted into said existing card slot.

5. The portable electronic apparatus according to claim 2, wherein said electric cable accommodating device covers said existing card slot when said electric cable accommodating device is inserted into said existing card slot.

6. The portable electronic apparatus according to claim 2, wherein said at least one electric cable is wound up about said reel in said electric cable accommodating device.

7. The portable electronic apparatus according to claim 6,
wherein said electric cable accommodating device further comprises a plurality of auxiliary guiding members and a separating plate, and wherein said at least one electric cable is guided along said auxiliary guiding members and said separating plate in said electric cable accommodating device.

8. The portable electronic apparatus according to claim 2,
wherein said at least one electric cable comprises a plurality of electric cables.

9. The portable electronic apparatus according to claim 2,
wherein said at least one electric cable comprises a plurality of electrical cables, and wherein said plurality of electric cables are drawn out from said electric cable accommodating device when said electric cable accommodating device is inserted into said existing card slot.

10. The portable electronic apparatus according to claim 9, wherein said rotatable reel comprises a plurality of reels, said plurality of electric cables being wound up about said plurality of reels in said electric cable accommodating device.

11. The portable electronic apparatus according to claim 10,
wherein said electrical cable accommodating device comprises a plurality of auxiliary guiding members and a plurality of separating plates, and wherein said plurality of electric cables are guided along said auxiliary guiding members and said separating plates in said electric cable accommodating device.

12. The portable electronic apparatus according to claim 2, wherein said electric cable accommodating device further comprises a guiding member to guide said at least one electric cable.

13. The portable electronic apparatus according to claim 2, wherein said at least one electric cable comprises a middle portion, said middle portion being fixed to said reel.

14. The portable electronic apparatus according to claim 2, wherein said at least electric cable comprises one of a modem cable and a universal serial bus cable.

15. A portable computer, comprising:

an electric cable accommodating device comprising a rotatable reel for accommodating a cable; and a card slot, said electric cable accommodating device being removably inserted into said card slot.

16. The portable computer according to claim 15, wherein said cable comprises a telephone wire for connecting said portable computer to a telephone line.

17. The portable computer according to claim 15, wherein said card slot comprises a local area network.

18. The portable computer according to claim 15, further comprising:

a modem; and a modem connector,
wherein an end of said cable is inserted into said modem connector to connect said modem to a telephone line.

* * * * *